United States Patent [19]

Barclay

[11] 4,187,003
[45] Feb. 5, 1980

[54] ELECTROLYTE FOR ELECTROCHROMIC DISPLAY DEVICE

[75] Inventor: Donald J. Barclay, Winchester, England

[73] Assignee: International Business Machines Corporation, Armonk, N.Y.

[21] Appl. No.: 935,399

[22] Filed: Aug. 21, 1978

[30] Foreign Application Priority Data

Nov. 2, 1977 [GB] United Kingdom ............... 45500/77

[51] Int. Cl.$^2$ ............................ G02F 1/17; G02F 1/23
[52] U.S. Cl. ..................................... 350/357; 252/408
[58] Field of Search ......................... 350/357; 252/408

[56] References Cited

U.S. PATENT DOCUMENTS

| | | | |
|---|---|---|---|
| 3,451,741 | 6/1969 | Manos .................................. | 350/357 |
| 3,712,709 | 1/1973 | Kenworthy .......................... | 350/357 |
| 3,774,988 | 11/1973 | Rogers ................................. | 350/357 |
| 3,806,229 | 4/1974 | Schoot et al. ....................... | 252/408 |
| 3,854,794 | 12/1974 | Van Dam et al. .................. | 350/357 |
| 3,912,368 | 10/1975 | Ponjee et al. ....................... | 350/357 |
| 3,950,077 | 4/1976 | Jasinski ............................... | 350/357 |
| 3,951,521 | 4/1976 | Findl .................................... | 350/357 |
| 3,961,842 | 6/1976 | Jasinski ............................... | 350/357 |
| 4,018,508 | 4/1977 | McDermott et al. ............... | 350/357 |
| 4,116,535 | 9/1978 | Ponjee et al. ....................... | 252/408 |

*Primary Examiner*—Teddy S. Gron
*Attorney, Agent, or Firm*—Joseph G. Walsh

[57] ABSTRACT

Improved performance is achieved in electrochromic display devices comprising an oxidation-reduction system and an electrolyte wherein the electrolyte comprises hypophosphite anions, phosphite anions, or both.

7 Claims, No Drawings

ELECTROLYTE FOR ELECTROCHROMIC DISPLAY DEVICE

DESCRIPTION

Technical Field

This invention relates to an electrolyte for use in an electrochromic display device.

Although various kinds of devices are known as electrochromic, for the purposes of this specification, the term electrochromic display device is used in the common sense, i.e. that which produces a display effect by the electrodeposition of a colored species from a liquid electrolyte onto a display electrode as a result of a reduction-oxidation reaction. The electrolyte is colorless or tinted in a color which contrasts with the deposited species.

The basis of operation of an electrochromic display device of the kind considered here is the electrochemical and chemical interaction between a suitable cation, $V^{++}$, and an anion $A^-$. Upon reduction of the cation a stable radical is formed:

$$V^{++} + e \rightarrow V^+$$

This combines with the anion to precipitate on the cathode (display electrode) to form a film whose resistance depends on the anion:

$$V^+ + A^- \rightarrow V^+A^-$$

Studies of the electrolyte can proceed in two virtually independent directions. Improvements can be sought in the cation or in the anion.

BACKGROUND ART

Of special interest as cations are the viologens, some of which, together with a large number of anions, are described and claimed in British Patent Specification No. 1,376,799 (U.S. Pat. No. 3,854,794) (German Pat. No. 2,260,048). In a paper by Schoot C.J., Ponjee J.J. et al, 1973 J. Appl. Phys. Vol. 23, p. 64, the particular electrolyte studied wad dihelpylviologen dibromide (N,N', di-hyptyl, 4,4' bipyridinium dibromide). On reduction of the viologen, a deep blue precipitate is formed with the bromide anion at the display electrode. At the anode a reverse reaction occurs. It has been found that the bromide anion corrodes and discolors the metal surface of the display electrode especially when silver, which is a highly preferred metal, is used, and that repeated reduction/oxidation cycles result in a non-erasible deposit on the cathode due to recrystallisation of the radical cation deposit.

In U.S. Pat. No. 3,950,077 to Raymond J. Jasinski, it is suggested that dihydrogen phosphate ($H_2PO_4^-$), or bicarbonate ($HCO_3^-$), be substituted for the bromide anion. The use of dihydrogen phosphate has solved the recrystallization and corrosion problems but the speed of the reactions at the electrodes is substantially reduced. In particular, erasure of the precipitate, besides being very slow, has been found to be highly temperature sensitive in the range of normal ambient temperatures, the erasure time increasing as temperature falls. Bicarbonate is not preferred by Jasinski.

It has been found that the precipitate formed with dihydrogen phosphate is highly resistive due, it is thought, to the unpolarizable nature of the dihydrogen phosphate molecule.

Jasinski, in his paper "The Electrochemistry of Some n-Hyptylviologen Salt Solutions" published in the Journal of the Electrochemical Society, May 1977, p. 637-640, considers besides $H_2PO_4^-$ and $HCO_3^-$, several other anions including $SO_4^=$, $F^-$, formate, and acetate.

British Patent Specification No. 1,314,049 (U.S. Pat. No. 3,712,709) proposes as cations N(p-cyanophenol) substituted derivatives of a compound having two conjugated nitrogen containing aromatic rings, and as anions chloride and ferrocyanide.

In papers delivered at the Fall Meeting of the Electrochemical Society, Oct. 17-22, 1976, at Las Vegas, J. J. Ponjee and J. Bruinink propose the use of a new viologen cation - tetramethyl bis - 4(1-benzyl pyridin-4'-yl)pyridinium - with a large anion such as $BF_4^-$ or $ClO_4^-$. These electrolytes seem to require a $SnO_2$ electrode.

DISCLOSURE OF THE INVENTION

According to the present invention, either or both hypophosphite or phosphite anions are used in an electrochromic electrolyte.

Hypophosphite ($H_2PO_2^-$) and phosphite ($HPO_3^{2-}$) can be characterized as the oxo anions containing one phosphorus atom and with phosphorous oxidation states lower than orthophosphate ($PO_4^{3-}$).

Phosphite and/or hypophosphite anions can be used either alone or buffered with dihydrogen phosphate anions and/or with bromide anions. Although studies have confirmed the improved performance of phosphite and hypophosphite with heptyl viologen, the results extend to viologens with other side chains and multiple bipyridinium structures. The invention is applicable to any of the cations referred to in the discussion above.

Although aqueous electrolyte solutions are generally preferred, some cations require organic solvents. The invention comprises both forms of solvent.

BEST MODE FOR CARRYING OUT THE INVENTION

By way of example, the following table gives the take-off or transition times for different current densities and the erase times for heptyl viologen with dihydrogen phosphate as the anion (column I), with both phosphite and dihydrogen phosphate as anions (column II), and with both hypophosphite and dihydrogen phosphate as anions (column III). The transition time is the time after which, for a given current density and electrochromic material concentration, undesirable electrochemical reactions occur, and is a measure of the diffusion coefficient or of the resistivity of the precipitate. A long transition time is advantageous in an electrochromic display since it enables more material to be precipitated at a single operation. This is important in speedily achieving the required amount of precipitate in a display device with many display electrodes. The initial solution was 0.1 M heptyl viologen dihydrogen phosphate in 1 M phosphate buffer. pH of the solution was 5.6. The temperature at which the measurements were made was 25° C. The phosphite and hypophosphite anions were obtained by saturating the initial solution with sodium phosphite and sodium hypophosphite respectively. The cathode was a plated silver electrode.

TABLE

| Current Density | Transition time (ms.) |
|---|---|

TABLE-continued

| mA/cm² | I | II | III |
|---|---|---|---|
| 130 | 4.5 | 5.0 | 28 |
| 260 | 2.0 | 1.5 | 10 |
| Erase time (ms.) | | | |
| — | 450 | 45 | 45 |

It will be noted that for the particular proportions of the experiment, the use of phosphite anions did not improve transition times whereas hypophosphite anions, besides showing the improved erasure time of phosphite, substantially improved the transition time.

Excess of the anionic species over the viologen dication is desirable for reasons of precipitate stability and conductivity and is achieved by adding the required anions as a sodium or potassium salt.

Besides the electrochromic display devices described in British Patent Specification 1,376,799 and U.S. Pat. No. 3,950,077, a different form of electrochromic display device - a matrix addressed display - suitable for use with the electrolyte of the invention is described in our copending British application 53080/75 (UK9-75-015), U.S. counterpart Ser. No. 742,049, now abandoned.

Having thus described my invention, what I claim as new, and desire to secure by Letters Patent is:

1. In an electrochromic display device which comprises a display electrode, an anode, and an aqueous electrolyte solution disposed therebetween which produces a display effect by electrodeposition of a colored species from the electrolyte onto the display electrode as a result of a redox reaction, the improvement according to which the electrolyte comprises an anion which is either hypophosphite or phosphite and a cation which has a bipyridinium structure.

2. An electrochromic display device as claimed in claim 1 wherein the electrolyte comprises hypophosphite anions.

3. An electrochromic display device as claimed in claim 1 wherein the electrolyte comprises phosphite anions.

4. An electrochromic display device as claimed in claim 1 wherein the electrolyte comprises both hypophosphite anions and phosphite anions.

5. An electrochromic display device as claimed in claim 1 wherein the electrolyte also includes bromide anions.

6. An electrochromic display device as claimed in claim 1 wherein the electrolyte also includes dihydrogen phosphate anions.

7. An electrochromic display device as claimed in claim 1 wherein the electrolyte comprises heptyl viologen cations.

* * * * *